(12) United States Patent
Riley et al.

(10) Patent No.: US 7,957,998 B2
(45) Date of Patent: Jun. 7, 2011

(54) SYSTEMS AND METHOD FOR GENERATING PLANOGRAM IMAGES

(75) Inventors: Colleen Riley, Minneapolis, MN (US); Troy Nece, Minneapolis, MN (US); Roger Burgess, Eagan, MN (US)

(73) Assignee: Target Brands, Inc., Minneapolis, MN (US)

( * ) Notice: Subject to any disclaimer, the term of this patent is extended or adjusted under 35 U.S.C. 154(b) by 470 days.

(21) Appl. No.: 12/253,088

(22) Filed: Oct. 16, 2008

(65) Prior Publication Data

US 2009/0043676 A1    Feb. 12, 2009

Related U.S. Application Data

(62) Division of application No. 11/045,992, filed on Jan. 28, 2005, now Pat. No. 7,440,903.

(51) Int. Cl.
*G06Q 10/00* (2006.01)

(52) U.S. Cl. ............ 705/7.12; 705/26.1; 705/28; 705/29

(58) Field of Classification Search ........ 705/7.11–7.42, 705/26.1–27.2, 28, 29, 14.4–14.7
See application file for complete search history.

(56) References Cited

U.S. PATENT DOCUMENTS

| | | | |
|---|---|---|---|
| 6,269,342 B1 | 7/2001 | Brick et al. | |
| 6,304,855 B1 | 10/2001 | Burke | |
| 6,442,530 B1 | 8/2002 | Miller | |
| 6,604,681 B1 | 8/2003 | Burke et al. | |
| 6,609,101 B1 | 8/2003 | Landvater | |
| 7,356,495 B2 | 4/2008 | Beigl et al. | |
| 2001/0051901 A1 | 12/2001 | Hager et al. | |
| 2003/0154141 A1 | 8/2003 | Capazario et al. | |
| 2003/0171979 A1 | 9/2003 | Jenkins | |
| 2003/0182193 A1 | 9/2003 | Kawamata | |
| 2003/0200129 A1 | 10/2003 | Klaubauf et al. | |
| 2003/0200148 A1 | 10/2003 | Razumov | |
| 2003/0216969 A1 | 11/2003 | Bauer et al. | |
| 2003/0229549 A1 | 12/2003 | Wolinsky et al. | |
| 2004/0002912 A1 | 1/2004 | Colon et al. | |
| 2004/0117243 A1* | 6/2004 | Chepil | 705/11 |

(Continued)

OTHER PUBLICATIONS

"Retailing Essentials". Community Pharmacy. Tonbridge: Jun. 1, 2001. p. 6. Retrieved via ProQuest.*

(Continued)

*Primary Examiner* — Michael A. Misiaszek
(74) *Attorney, Agent, or Firm* — Griffiths & Seaton PLLC

(57) ABSTRACT

A retail system for implementing planograms includes a communications network, a central computing system, and a plurality of retail computing systems. The central computing system is configured to receive and to transmit a plurality of planograms, each planogram being associated with one retail store of a plurality of retail stores and a plurality of products to be displayed for sale at the associated retail store. Each planogram includes data indicating threshold quantities of each product of the associated plurality of products. Each retail computing system is at a corresponding one of the plurality of retail stores and is configured to receive, via the communications network, planograms associated with the corresponding retail store and to receive inventory information indicating in-stock quantities of the plurality of products associated with each planogram. Each retail computing system is also configured to provide a readiness rating value for each planogram, the readiness rating value being based on a comparison of the threshold quantities and in-stock quantities of each product associated with the planogram and being indicative of whether the planogram is ready to be implemented.

20 Claims, 7 Drawing Sheets

U.S. PATENT DOCUMENTS

2005/0256726 A1    11/2005    Benson et al.

OTHER PUBLICATIONS

"ACNielsen Launches SPACEMAN Merchandiser in 22 Countries". PR Newswire. New York: Jun. 9, 1998. p. 1. Retrieved via ProQuest.*

"Managing store space smartly". Hardware & Home Centre Magazine. Don Mills: Jan. 1996. vol. 20, Iss. 1: p. 57. Retrieved via ProQuest.*

"Making Space Management Work". Garry, Michael. Progressive Grocer. New York: May 1991. vol. 7, Iss. 5; p. 106, 6 pgs. retrieved via ProQuest.*

"AccessVia Signs Staples for Web Printing Technology; Office Supply Superstore to Deploy Web dSignShop Enterprise-wide," Business Wire, Jun. 25, 2002.

"ACNielsen: Consumer Insight Magazine," <http://www.acnielsen.com/pubs/ci/1999/q4/products/mss.htm>.

"Albertsons' Triple Threat; the 2,301-Store Chain is Investing in it to Address its Three Major Constituencies—Suppliers, Employees and, of course, Customers," Supermarket News, Jun. 9, 2003.

"Connecting the Dots," National Home Center News What's Next for e-commerce Supplement, Mar. 19, 2001.

"DET Introduces New Concept in Electronic Shelf Labels; Open Retail Not Just Another Pretty Price," PR Newswire, Nov. 6, 2000.

"Help on hand at Nisa's," Off License News, Mar. 2, 2001.

"Intactix Enterprise Suite—What's New—Release 2003.5.0," pp. 1-9.

"Intactix Users Ride the Next Weave with WebShelf," Business Wire, Jul. 9, 1997.

"Intactix Solutions Made Convenient for Circle K," Business Wire, Aug. 14, 1998.

"IntelliBrand—Taking Control of your Brands Destiny—Product Datasheet" http://www.wasptech.com.

"Internet Retailer.com: The Webogram," http://www.internetretailer.com/printArticle.asp?id=11217.

"JDA Software Announces Significant Win with Leading United Kingdom Drugstore Chain-Boosts the Chemists Selects Portfolio Space Management Suite to Streamline Store-Level Assortments and Increase Profitability," Business Wire, Jun. 19, 2003.

"JDA Software Announces Significant Win with Leading United Kingdom Drugstore Chain," Business Wire, Jun. 19, 2003.

"JDA Software to Preview Advancements to Portfolio 2004.1 at NRF; JDA Joins Dollar General and Microsoft at NRF Presentations," Business Wire, Jan. 8, 2004.

"JDA to Integrate M-Commerce Portal with Symbol Devices," JDA Software Group, Inc., 2001 http://www.findarticles.com/cf_dls/m01GV/9_7894899/print.jhtml.

"Layout Functionality in SAP Retail-in Particular the Integration of External Space Management Programs," <http://www.sap-si.com/files/White%20Paper_e.pdf>.

"MarketMAX Enhances Product Site," Business Wire, Jan. 15, 1999.

"MarketMAX Breaks New Ground with Web-Based, Hosted Service for Innovative Merchandising, Planning & Optimization," Business Wire, Apr. 17, 2000.

"Metiri Mensus-Enterprise Information Delivery-Business Intelligence," <http://www.metirimensus.com.au/solutions/merchandising/distribution.html>.

"New Solutions Address Top Industry Issues," Progressive Grocer, Jul. 1998.

The Perfice Store (marketing and merchandising advice), Automotive Marketing, Jan. 2001.

"Planogram Planning," Automotive Marketing, Jan. 2001.

"Pricer/Intactix Translates Space Management; Delivers Results for Japan's the Daiei Inc.," PR Newswire, Apr. 27, 1998.

"Pricer/Intactix Provides New Web-Based Planogram Solution for Retailers and Consumer Packaged Goods Manufacturers," PR Newswire, Jun. 16, 1998.

"Pricer/Intactix," Chain Store Executive with Shopping Center Age Aug. 1998.

"RF in Retail White Paper," <http://www.ara.com.au/e_commerce/retailmobility.pdf>.

"Shaw's Supermarkets Stay on Top with JDA Portfolio Space Management Solutions," Progressive Grocer Annual Report, Apr. 2001.

"Supply Chain Management with Efficient Item Assortment by Intactix," <http://www.jda.com/s_IntactixWeb.asp>.

"Symbol and Retail Solutions Provider JDS Software Sign Agreement—JDA to Integrate M-Commerce Portal with Symbol Devices," <http://www.symbol.com/news/pressreleases/pr_mobile_jda.html>.

"Tesco Lotus Supercenter Signs on with Intactix in Thailand," Business Wire, Oct. 7, 1999.

"TruSery and NRHA Join Forces to Provide Members with NRHA Online Services, Training, Research and Data," PR Newswire, Dec. 14, 1999.

"Web Publisher by Intactix: Harnessing the Internet for easy Planogram Viewing," JDS Software Group, Inc. http://www.jda.com/s IntactixWeb.asp.

* cited by examiner

| On Line POG : Selection List | | | | | | | □ _ □ × |
|---|---|---|---|---|---|---|---|

Eff Date: [4/18/2004 ▼]  Dept# [All Departments ▼]  POG# [All POGs ▼]
(Sunday)

End Date: [4/24/2004 ▼]  Tle: ⦿All ○Yes ○No                [Update List]
(Saturday)

Page 7 of 11

| POG | Rev Date | Dpt | POG Name | FTG Ready | % Label Type | Standard/ Reverse | Pre Tie | Tie | Request Review |
|---|---|---|---|---|---|---|---|---|---|
| 4072049 | 04/16/04 | 72 | ~~~~~~ | 16 | 94 Label Strip | S | A59(9) | | ☐ |
| 4072057 | 04/18/04 | 72 | ~~~~~~ | 24 | 62 Label Strip | S | | B32(1) | ☐ |
| 4072064 | 04/18/04 | 72 | ~~~~~~ | 24 | 56 Label Strip | R | B37(8) | | ☐ |
| 4072072 | 04/18/04 | 72 | ~~~~~~ | 24 | 63 Label Strip | S | B34(0) | | ☐ |
| 4072075 | 04/18/04 | 72 | ~~~~~~ | 24 | 75 Label Strip | R | B33(0) | | ☐ |
| 4088008 ✓ | 04/18/04 | 88 | ~~~~~~ | 24 | 90 Store Print | S | | D32(1) | ☑ |

[Exit]   [Review Label & Signs]   ◄ ▶

Fig. 3

POG Detail — 130

POG: 4088008
Rev Date: ✓
Eff Date: 04/16/04
Dpt: 88
POG Name: ~~~~~~
FTG: 24
% Ready: 95
Label Type: Store Print
Standard/Reverse: S
Pre Tie: —
Tie: D32(1)

POG Details — 134

- Cover Page
- Section: All ▼ (138)
- Image (140)
- Schematic (142)
- Blue Print (144)
- Line Listing (146)

Select Labels & Signs — 136

- ☑ Header Labels (1) — 150
- ☐ Price Accuracy Labels (0) — 154
- ☑ POG Labels (110) — 152
- Print Labels — 148

SIGNS
- ☑ All (8) — 158
- Print Signs — 156

Return

Fig. 4

«SYSTEMS AND METHOD FOR GENERATING PLANOGRAM IMAGES

CROSS-REFERENCE TO RELATED APPLICATIONS

This application is a divisional of U.S. patent application Ser. No. 11/045,992, filed Jan. 28, 2005, and entitled "SYSTEM AND METHOD FOR EVALUATING AND RECOMMENDING PLANOGRAMS," which is incorporated herein by reference in its entirety.

BACKGROUND OF THE INVENTION

As the retail industry continues to become more competitive, customer satisfaction is of paramount importance in establishing and maintaining customers. Customer satisfaction is generally based on a customer's "total shopping experience" at a retail store, which depends on a variety of factors such as a customer's perception of price, product availability, customer service, friendliness of employees, cleanliness of the store, and the presentation of products within the store. The presentation of products includes factors such as whether the products are displayed in a pleasing fashion, whether the products are easy to locate, whether the products are well stocked, and whether the products are within easy reach.

Consequently, retailers expend great effort designing product displays that are visually pleasing and enable a customer to locate and select desired products for purchase. Such effort generally includes the development of what is commonly referred to as a "planogram." A planogram is a layout, or "blueprint", that assigns a specific display location on a specific display fixture within a retail store to each product to be displayed. For example, a planogram may assign each product to a specific location on specific shelf or to a specific hook of a specific peg grouping of a particular display fixture within the retail store. Planograms typically provide other information associated with the products to be displayed, such as, for example, the quantities of each product and corresponding pricing information (e.g. labels).

Typically, centrally located employees, such as at a corporate headquarters, for example, develop planograms for particular sets of products for particular time frames. Because individual retail stores often have different shelving and display configurations, unique planograms are typically developed for each retail store. Planograms generally have an effective date, subsequent to which the planogram is to be implemented as expeditiously as possible by retail store personnel, and are "active" for their particular time frame beginning with the effective date. The active time frame may vary between planograms. For example, one planogram may have an active time frame of one week (e.g. a sale period) while another planogram may have an active time frame of one year.

Once developed, planograms are typically printed on paper ("published") and delivered to individual retail stores two to three weeks prior to their effective date. Delivery of the planograms to each retail store can often take two to three days. While delivering published planograms to stores for subsequent implementation is generally effective, revisions are often made to planograms subsequent to their publication date but prior to their effective date. Due to the lag created by the delivery process, it is sometimes difficult, if not impossible, for retail stores to implement the revised planogram on the associated effective date, as is preferred.

As a result, the retail store may choose to temporarily implement the original planogram and then reconfigure or rework that implementation after receipt of the revised planogram. Implementation of the revised planogram is delayed, and added labor costs are incurred resulting from implementing multiple planograms. In addition to the above-described delays and expenses, each retail store also incurs expenses related to the cumbersome tasks of sorting, copying, filing, and maintaining records of the published planograms.

SUMMARY OF THE INVENTION

One embodiment of the present invention relates to a retail system for implementing planograms. The retail system includes a communications network, a central computing system, and a plurality of retail computing systems. The central computing system is configured to receive and to transmit a plurality of planograms, each planogram being associated with one retail store of a plurality of retail stores and a plurality of products to be displayed for sale at the associated retail store. Each planogram includes data indicating threshold quantities of each product of the associated plurality of products, with the needed or desired number of facings. Each retail computing system is at a corresponding one of the plurality of retail stores and is configured to receive, via the communications network, planograms associated with the corresponding retail store and to receive inventory information indicating in-stock quantities of the plurality of products associated with each planogram. Each retail computing system is also configured to provide a readiness rating value for each planogram, the readiness rating value being based on a comparison of the threshold quantities and in-stock quantities of each product associated with the planogram and being indicative of whether the planogram is ready to be implemented.

BRIEF DESCRIPTION OF THE DRAWINGS

Embodiments of the invention will be described with respect to the figures, in which like reference numerals denote like elements, and in which:

FIG. 3 is an illustrative example of a graphical user interface for use with one embodiment of an on-line planogram system according to the present invention.

FIG. 4 is an illustrative example of a graphical user interface for use with one embodiment of an on-line planogram system according to the present invention.

DETAILED DESCRIPTION

Figure 1:
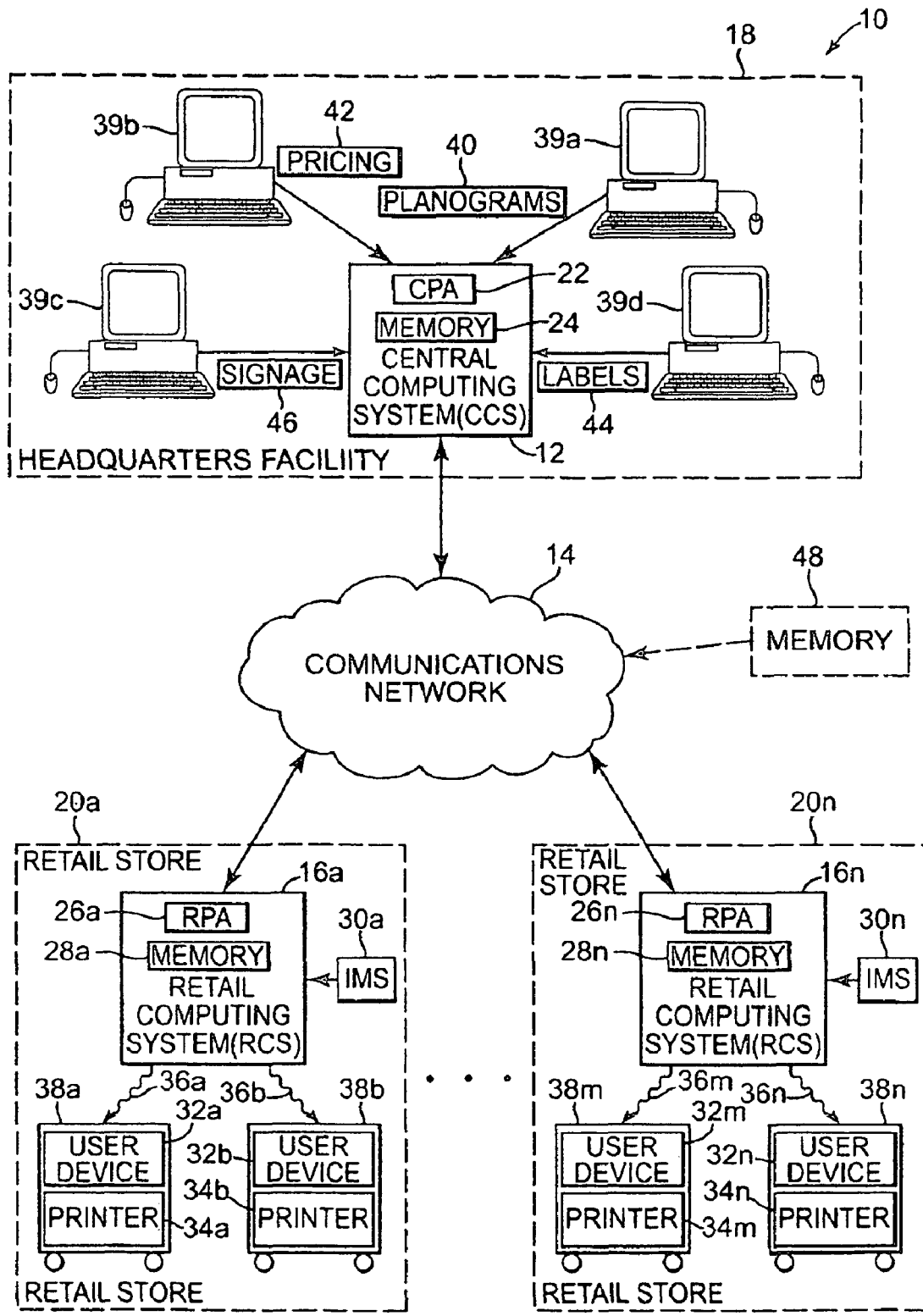
FIG. 1 is a block diagram illustrating generally an on-line planogram system in accordance with the present invention.

FIG. 1 is a block diagram illustrating generally a retail system 10 in accordance with the present invention that enables retail stores to access and implement planograms via an on-line format. Retail system 10 includes a central computing system (CCS) 12, a communications network 14, and one or more retail computing systems (RCS) 16, indicated as 16a through 16n. In one embodiment, as illustrated, retail system 10 is employed by a retail corporation with CCS 12 being located at a central facility, such as at a headquarters facility 18, and each RCS 16 being located at a corresponding retail store 20, indicated as retail stores 20a through 20n.

CCS 12 and each RCS 16 may comprise one or more types of computing systems such as, for example, servers, personal computers, workstations, laptops, or other systems capable of performing processes consistent with the present invention. Communications network 14, as employed herein, is preferably Internet-based and may include local area networks, wide area networks, and private networks (e.g. Intranets), but can comprise any suitable network of communications links that supports communications between computers or other suitable electronic devices, as understood by those skilled in the art.

In one embodiment, as illustrated, CCS 12 includes a central planogram application (CPA) 22 and a memory 24, wherein CPA 22 comprises an electronically readable code installed and operating on CCS 12. Similarly, each RCS 16 includes a retail planogram application (RPA) 26 and a memory 28, illustrated respectively as 26a to 26n and 28a to 28n, wherein RPA 26 comprises electronically readable code installed and operating on RCS 16.

In one embodiment, as illustrated, each retail store 20 includes an inventory management system (IMS) 30, indicated as 30a through 30n, configured to provide real-time tracking of in-stock quantities of products available for sale within the associated retail store. Although illustrated as being separate from RCS 16, all or portions of IMS 30 may be installed and operating on RCS 16. Each retail store 20 further includes one or more user devices 32 and output devices 34 (e.g. printers), illustrated respectively as 32a through 32n and 34a through 34n, which are in communication with RCS 16. User devices 32 may comprise any type of electronic device suitable for communication with RCS 16, such as, for example, a personal computer, a laptop computer, or tablet style computing device. In one embodiment, user device 32 comprises a tablet 32 and output device comprises a printer 34, each of which are in wireless communication with RCS 16. In one embodiment, both tablet 32 and printer 34 are connected to RCS 16 via a radio frequency (RF) network, illustrated generally at 36a through 36n. In one embodiment, as illustrated, both user device 32 and output device 34 are located on a cart or other mobile platform 38 that enables user device 32 and output device 34 to be positioned on a sales floor of the associated retail store 20 while maintaining RF communications with RCS 16.

CPA 22 is configured to receive, such as via one or more user devices 39 (illustrated as 39a through 39d) in communication with CCS 12, a plurality of planograms 40 developed by headquarters facility or other personnel. The plurality of planograms 40 may comprise original planograms being initially received by CPA 22 and revised planograms updating planograms previously received by CPA 22. Each planogram of the plurality of planograms 40 is associated with one retail store of the plurality of retail stores 20, such as retail store 20a, for example, and each is associated with a plurality of products to be displayed for sale at the associated retail store.

As generally known to those skilled in the art, retail stores typically display products for sale via a variety of display fixtures (e.g. stands having vertically arranged shelves, pegboards having groupings of display hooks, display cases, bins, etc.) which are positioned along aisles and other customer circulation areas on the sales floor of the retail store. Each planogram corresponds to a selected portion of such display fixtures and assigns to each product of the associated plurality of products a unique location on a shelf, display hooks, or other display means associated with the selected portion of display fixtures. In other words, each planogram provides a specific arrangement for the associated plurality of products to be displayed via the selected portion of display fixtures.

In one embodiment, each of the planograms 30 includes data indicating threshold quantities of each product of the plurality of products associated with the planogram. In one embodiment, the threshold quantity represents the minimum quantity of units of a particular product required to "face" the display. The term "facing", as generally known to those skilled in the art, refers to the number of products facing a consumer in the forward most position of a display fixture. Thus, for example, if a particular product is displayed in four adjacent rows on a shelf with the product stacked two-high in each row, a minimum of eight units of the product is required to face the display.

In one embodiment, CPA 22 is configured to receive pricing information 42 comprising current retail prices of products associated with planograms 40. In one embodiment, CPA 22 is configured to receive label information 44 associated with planograms 40 including information such as, for example, a description of each of the products, stock keeping units (SKUs) for each product, and information related to each product's position on a particular display fixture within the corresponding retail store. In one embodiment, CPA 22 is configured to receive signage information 46 associated with planograms 40 including information related to one or more signs which are to be affixed to appropriate display fixtures associated with planograms 40. Similar to planograms 40, pricing information 42, label information 44, and signage information 46 include original information being initially received by CPA 22 and revised information updating information previously received by CPA 22.

In one embodiment, CPA 22 is configured to store planograms 40, pricing information 42, label information 44, and signage information 46 in memory 24. Alternatively, in one embodiment, CPA 22 is configured to store planograms 40, pricing information 42, label information 44, and signage information 46 in memory 48 coupled to communications network 14, but remote from headquarters facility 18. Memory 48 may comprise a magnetic, semiconductor, and/or optical type storage device.

In one embodiment, CPA 22 is configured to transmit each of the planograms to its associated retail store 20 via communications network 14. In one embodiment, in addition to planograms 40, CPA 22 is further configured to transmit pricing information 42, label information 44, and signage information 46 associated with each planogram.

Each RPA 26 is configured to receive planograms 40 and related information (e.g. pricing information 42, label information 44, and signage information 46) associated with the corresponding retail store 20, which are transmitted by CCS 12 via communications link 14. In one embodiment, RCS 26 is configured to store the received planograms 40, pricing information 42, label information 44, and signage information 46 in memory 28.

Alternatively, in one embodiment, in lieu of CPA 22 transmitting planograms 40 and other information to its associated retail store 20, each RPA 26 is configured to access associated planograms 40 and related information from one or more memory locations, such as memory 24 and/or memory 48, via communications link 14. In such an embodiment, long-term storage of such data at each retail store 20, such as at memory 28 of RCS 16, is eliminated.

As described above, each planogram is active for a particular time frame (e.g. a sale period, holiday, promotion, etc.) beginning with an associated effective date, during which timeframe the associated plurality of products are to be arranged in accordance with the planogram. On the effective date of each planogram, or as soon as possible thereafter, retail store personnel lay-out and arrange the associated plurality of products on the appropriate display fixtures in accordance with the planogram. Such a process is referred to as "setting" the planogram. However, it is generally desirable to set a planogram only if the retail store has enough of the associated plurality of products in stock to provide the planogram with a complete or finished appearance. Setting a planogram with too few products may result in the display units having one or more empty spaces and the planogram having an empty and undesirable appearance.

In one embodiment, RPA 26 is further configured to receive from the IMS 30 of the associated retail store inventory information indicating in-stock quantities of the plurality of products associated with each planogram. In one embodiment, each RPA 26 is configured to provide a "readiness" rating for each planogram, wherein the readiness rating is indicative of whether the planogram is ready to be implemented and is based on a comparison of the threshold quantities and in-stock quantities of the plurality of products associated with the planogram.

In one embodiment, the readiness rating of a planogram comprises the percentage of the sum total of the threshold quantities of each product of the plurality of products associated with the planogram that are indicated as being in-stock based on the inventory information received from IMS 30 of the associated retail store. For example, assume that an example planogram includes four products which are to be displayed, the first product having a threshold value of forty (i.e. forty units of the product required to "face" the display), the second product a threshold value of thirty, the third a threshold value of twenty, and the fourth product a threshold value of ten. As such, the planogram has a total threshold value of one hundred. Now assume that the inventory information indicates that there are thirty-five in-stock units of the first product, twenty-five in-stock units of the second product, twenty in-stock units of the third product, and ten in-stock units of the fourth product. As such, the associated retail store has a total of ninety in-stock units of products associated with the planogram. Dividing the total in-stock units by the total threshold value yields a readiness rating of ninety percent for the example planogram.

In one embodiment, RPA 26 is further configured to provide an implementation recommendation for each planogram based on the readiness rating. In one embodiment, a readiness rating of eighty percent or above has a "high" implantation recommendation indicating that the planogram should be set, a readiness rating between fifty and eighty percent has an "intermediate" implementation recommendation indicating that it is acceptable to set the planogram, and a readiness rating less than fifty percent has a "low" implementation recommendation indicating that planogram should not be set.

To determine if and when any planograms are to be implemented within the associated retail store, a retail store employee accesses RPA 26 via user device 32. In one embodiment, a graphical user interface (GUT) associated with user device 32 enables the retail store employee to select and view planograms associated with the retail store including their corresponding effective dates, readiness ratings, and implementation recommendations. An example of such a GUI is illustrated and described below by FIG. 3. Based the corresponding effective dates, readiness ratings, and implementation recommendations, the retail store employee can determine which and in what order various planograms should be implemented or set.

For example, based on a first planogram having a "low" implementation recommendation, the retail store employee may choose to delay implementation of a first planogram until the associated products are in-stock, even though the current date is beyond the first planogram's effective date. Instead, the employee may opt to implement a second planogram having a "high" implementation recommendation, even though the second planogram's effective date is later in time than the effective date of the first planogram. Using this approach, a retail store 20 can choose to first implement those planograms which will present a more complete and desirable appearance before those planograms which may have an "under-stocked" and incomplete appearance, in hopes that necessary stocks of products will become available in the interim.

By employing an on-line planogram system 10 in accordance with the present invention, retail stores can more effectively utilize limited employee resources by selectively implementing those planograms having associated products which are currently in-stock prior to those planograms having associated products not presently available. Additionally, because planograms and associated information (e.g. pricing, labeling, and signage) and any subsequent revisions are received by retail system 10 and transmitted to the appropriate retail stores in real time, drawbacks associated with delivery of published planograms to retail stores are greatly reduced and/or eliminated. Furthermore, costs associated with maintaining records associated with published planograms are eliminated, as planograms are now available and maintained in on-line format.

In one embodiment, each of the plurality of planograms 40 includes a digital image illustrating a respective position of each product associated with the planogram on the selected portions of one or more display fixtures on which the planogram is to be implemented. In one embodiment, photographic pictures of actual product may be displayed in the respective positions on the one or more display fixtures. Planograms are typically provided by headquarters facility personal with a "forward" orientation, with the left end of the planogram corresponding to one end of the selected portion of display fixture(s) and the right end of the planogram corresponding to the opposite end of the selected portion of display fixture(s).

Thus, for a planogram with a forward orientation, an Item A is assigned to left end and an Item B is assigned to the right end of the planogram, such that Item A is the first item and Item B is the last item a customer sees when the customer is looking to his/her left when walking from the first end to the second end of the selected portion of the display fixture(s). However, if the configuration of a particular retail store is such that the planogram is to the right of the customer as the customer walks from the first end to the second end of the selected portion of display fixture(s), Item A must be assigned to the right end and Item B to the left end of the selected portion of display fixture(s). When required, converting a planogram from a forward orientation to a "reverse" orientation can be a cumbersome and time consuming task for retail store employees and is subject to mistakes which can result in improper setting of the planogram.

In one embodiment, each RPA 26 is configured to convert the digital images of planograms associated with the corresponding retail store 20 from a forward orientation to a reverse orientation. In one embodiment, RPA 26 enables a retail store employee, via user device 32, to selectively choose which planograms to convert from the forward to the reverse orientation. In one embodiment, RPA 26 enables the retail store employee to view the digital image in either the forward and/or the reverse orientation via a display associated with user device 32. In one embodiment, RPA 26 enables the retail store employee to print the digital image in either the forward and/or the reverse orientation via printer 34. As such, when necessary, retail system 10 enables a retail store employee to automatically reverse the orientation of the digital image and to immediately view the reversed image, thereby reducing the chance for errors and the time required for implementation when retail store employees set planograms having a reverse orientation.

Figure 2A:
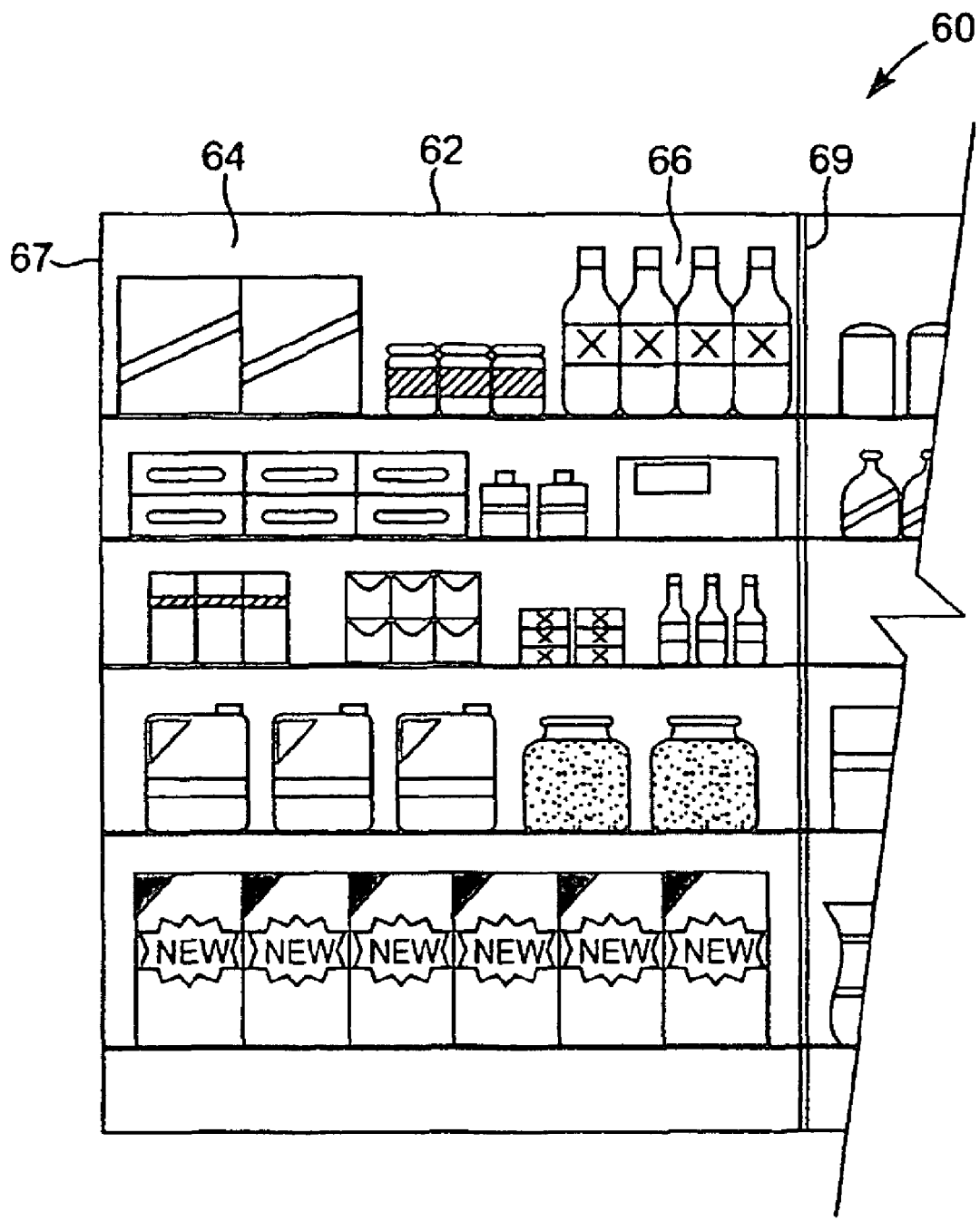
FIG. 2A is an illustration of an example digital image illustrating a portion of planogram having a forward orientation.

FIG. 2A is an illustration of an example digital image 60 illustrating a portion of planogram having a forward orientation. A display fixture 62 having a plurality of vertically configured shelves represents a portion of multiple display fixtures employed by the planogram. As illustrated, a first product 64 is located on the left end and a second product 66 is located on the right end of display fixture 62 when a customer looks to his/her left when walking past display fixture 62 in a direction from a first end 67 to a second end 69.

Figure 2B:
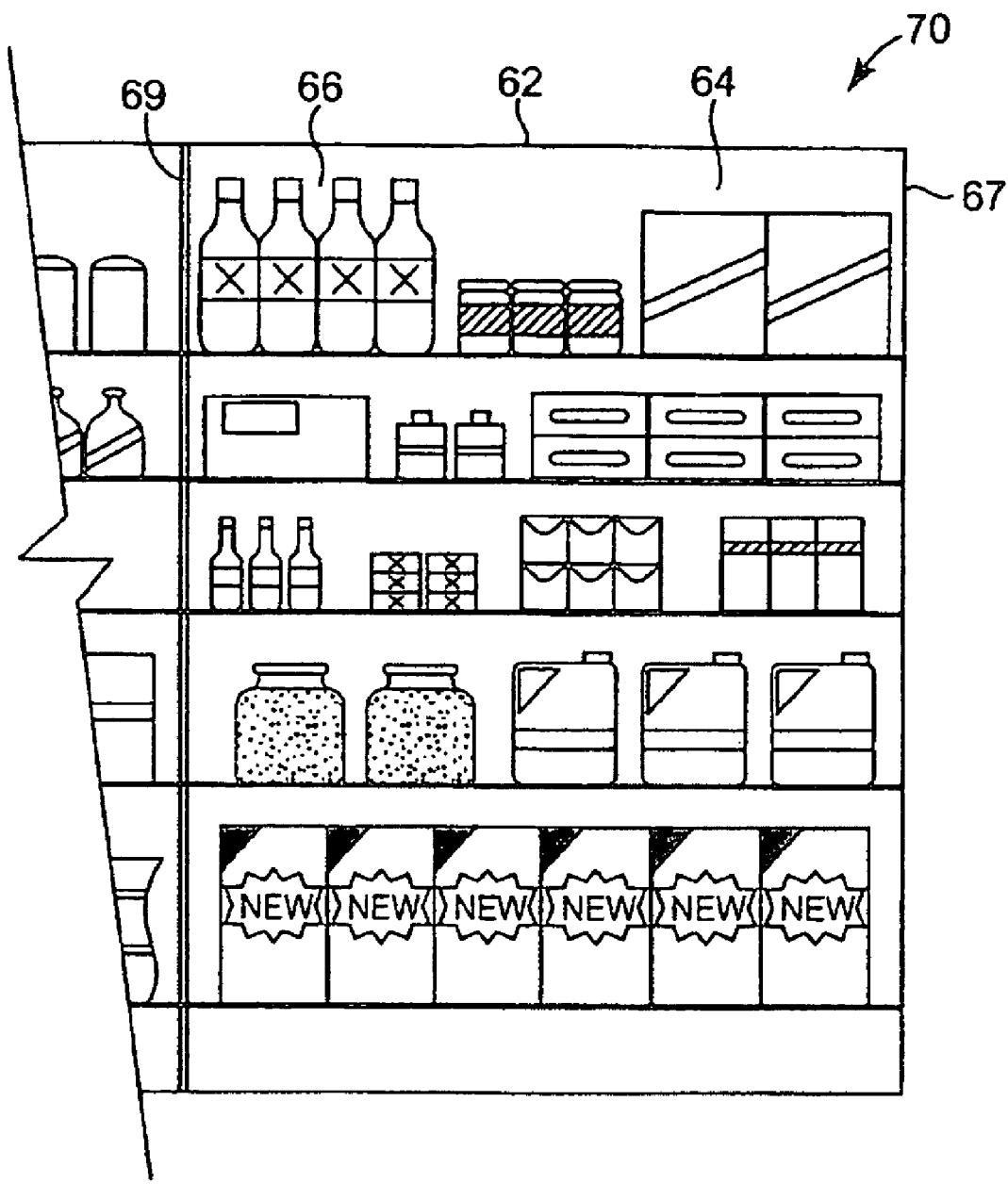
FIG. 2B is an illustration of an example digital image illustrating the portion of the planogram of FIG. 2A having a reverse orientation.

FIG. 2B illustrates an example digital image 70 comprising the digital image 60 of FIG. 2A after being converted by RPA 26 to have a reverse orientation. As illustrated, first product 64 is now located on the right end and second product 66 on the left end of display fixture 62 when a customer looks to his/her right when walking past display fixture 62 in the direction from first end 67 to second end 69.

In one embodiment, RPA 26 is configured to provide labels associated with each product of planograms associated with the corresponding retail store 20 based on price information 42 and label information 44. As described above, the labels includes information such as, for example, a product description (e.g. brand name, unit size, etc.), the product SKU ("stock keeping unit"), and the product UPC ("uniform product code"). In one embodiment, when "setting" a planogram, a user (e.g. a retail store employee) is able to select labels corresponding to the planogram via user device 32 (see FIG. 4 below) and print the selected labels via printer 34. The printed labels are then affixed to the display fixtures at the corresponding product location. Because pricing information 42 and label information 44 is received by CPA 22 and provided to each RPA 26 in real-time, the most current pricing information 42 and label information 44 is available to each retail store location 20.

In one embodiment, headquarters facility personnel print and deliver labels for each planogram to the corresponding retail stores 20 prior to the effective dates of the planograms. The pre-printed and delivered labels are referred to as "label strips." If pricing information 42 and/or label information 44 corresponding to a given planogram is revised in the interim period between delivery of the pre-printed labels and the effective date of the planogram, RPA 26 is configured to provide notification via user device 32 (see FIG. 4 below) to a retail store employee that at least some of the labels for the planogram will need to be re-printed at the retail store to replace the delivered labels that are no longer valid. The labels that are to be re-printed locally at retail store 20 via printer 34 are referred to as "price accuracy" labels. When re-printing labels, the user can selectively print only those labels that have been revised or can choose to re-print all labels associated with the planogram.

In one embodiment, in a fashion similar to that described above with respect to labels, RPA 26 is configured to provide signs associated with each planogram associated with corresponding retail store 20 based on signage information 46. There are several categories of signs which may correspond to each planogram such as, for example, informational signs (e.g., descriptions of products and/or types of products) ad signs (e.g. product sale prices), and special event signs (e.g. "temporary price cut" signs). In one embodiment, when "setting" a planogram, a user (e.g. a retail store employee) is able to select signs corresponding to the planogram via user device 32 (see FIG. 4 below) and print the selected signs via printer 34. The printed labels are then affixed to the display fixtures at the proper locations. Because signage information 46 is received by CPA 22 and provided to each RPA 26 in real-time, the most current signage information 46 is available to each retail store location 20.

In one embodiment, headquarters facility personnel print and deliver signs for each planogram to the corresponding retail stores 20 prior to the effective dates of the planograms. If signage information 46 corresponding to a given planogram is revised in the interim period between delivery of the pre-printed signs and the effective date of the planogram, RPA 26 is configured to provide notification via user device 32 (see FIG. 4 below) to a retail store employee that at least some of the signs for the planogram will need to be re-printed at the retail store to replace the delivered labels that are no longer valid. When re-printing signs, the user can selectively print only those signs that have been revised or can choose to re-print all signs associated with the planogram.

FIG. 3 is an illustrative example of a GUI 80 (i.e. application screen) which is displayed via user device 32 and enables a user (e.g. a retail store employee) to select and view planograms associated with the retail store. GUI 80 includes a planogram selection menu 82 that enables the user to select various parameters associated with the planograms such as an effective date 84, a retail store department 86 (e.g. sporting goods, toys, electronics, personal care, etc.), and a planogram (POG) number 88. After selecting the desired parameters, the user selects an "Update List" icon 90 and all planograms matching the selected parameters are listed in a planogram display area 92.

Display area 92 lists the matching planograms in a columnar fashion and displays a plurality of parameters associated with each planogram, such as the planogram (POG) number 94 (each planogram is assigned a unique POG number), whether the planogram has been revised 96 (such as with a "checkmark" as illustrated), the effective date 98, the corresponding retail store department 100, the planogram name 102, the length of the planogram (e.g. length, in feet, of display fixtures employed) 104, the readiness rating 106, the label type employed 108 (the term "Label Strip" indicating that pre-printed labels have been provided for the planogram, and the term "Store Print" indicating that labels must be printed at the corresponding retail store), and the planogram orientation 110 ("S" indicating standard or forward orientation and "R" indicating reverse orientation). In one embodiment, as illustrated, planogram orientation 110 comprises an icon that enables a user to select the planogram orientation and, thus the orientation of the associated digital image, wherein selecting the icon toggles the orientation back and forth between the standard orientation (forward) and reverse orientation.

In one embodiment, the implementation recommendation for each planogram is indicated by highlighting the readiness rating 106 with a color according to a color coding system. As illustrated, the color coded implementation recommendation is illustrated by the shaded rectangle 112 surrounding the readiness rating 106. In one embodiment, readiness ratings having a "high" implementation recommendation are highlighted with green, reading ratings having an "intermediate"

implementation rating are highlighted with yellow, and readiness ratings having a "low" implementation rating are highlighted with red.

In one embodiment, as illustrated, the matching planograms are listed numerically based on the POG number 94. A user can scroll through the list of matching planograms using the arrow icons 114. As the user scrolls though the list, one or more planograms can be selected for more detailed review by highlighting the corresponding request review icon 116. After selecting desired planograms for further review, such as POG number "4088008", as indicated at 118, the user selects a review icon 120. The user is then able to review selected planograms in more detail via another GUI, such as that illustrated below by FIG. 4.

FIG. 4 is an illustrative example of a GUI 130 (i.e. application screen) which is displayed via user device 32 and enables a user (e.g. a retail store employee) to select and view information associated with planograms selected via GUI 80 as described above. GUI 130 includes a planogram list area 132 which lists the selected planograms, such as planogram 118 (i.e. POG number "4088008") as indicated on FIG. 3, a "POG Detail" menu 134 and a "Labels & Signs" menu 136.

Via a pull-down menu 136, a user can select to view information associated with particular sections of a planogram (e.g., a particular section of a display fixture). By selecting "Image" icon 140, the user is able to view and/or print the digital image (see FIGS. 2A and 2B) of the selected planogram section. Via "Schematic" icon 142, a user can view and/or print a schematic diagram of the selected planogram section, the schematic diagram comprising a general illustration of the corresponding display fixture. Via "Blue Print" icon 144, a user can view and/or print a blue print of the selected planogram section, the blue print illustrating precise locations for all display means associated with the display fixture such as, for example, shelves and display hooks. Via "Line Listing" icon 146, a user can view and/or print a line listing associated with the selected planogram section, the line listing comprising information for each product associated with the selected planogram section such as, for example, product descriptions, product quantities, product SKU numbers ("stock keeping unit"), and product UPC codes ("uniform product code").

"Print Labels" icon 148 enables a user to print "header" labels and "POG Labels" respectively selected via "selection" icons 150 and 152. A header label is a label affixed to one of the one or more display fixtures associated with the planogram and includes planogram information such as, for example, the planogram number and the length of the planogram. The "POG Labels" are, as described above, labels associated with each product of the planogram and which are affixed to the display fixtures at the corresponding product position. In one embodiment, a user can choose to print all POG labels associated with a planogram or to print only selected POG labels associated with the planogram.

As described above, when pre-printed labels are provided by headquarters facility personnel and there have been price changes to one or more of the pre-printed labels, due to a price modification, for example, RPA 26 is configured to provide notification to a user that one or more of the labels for the planogram will need to be re-printed to replace the delivered labels that are invalid. When such a price modification occurs, RPA 26 automatically notifies the user that replacement or "price accuracy" labels must be locally printed by placing a "checkmark" or other indicating symbol at "selection" icon 154. The user can then print the revised labels by selecting "print labels" icon 148.

"Print Signs" icon 156 enables a user to print signs associated with the planogram that have been selected via "selection" icon 158. In one embodiment, a user can choose to print all signs associated with the planogram or to print only selected signs associated with the planogram. In a fashion similar to that described above with respect to "price accuracy labels", RPA 26 automatically notifies the user that a replacement header label and replacement signs must be locally printed by placing a "checkmark" or other indicating symbol at "selection" icons 150 and 158.

Figure 5:
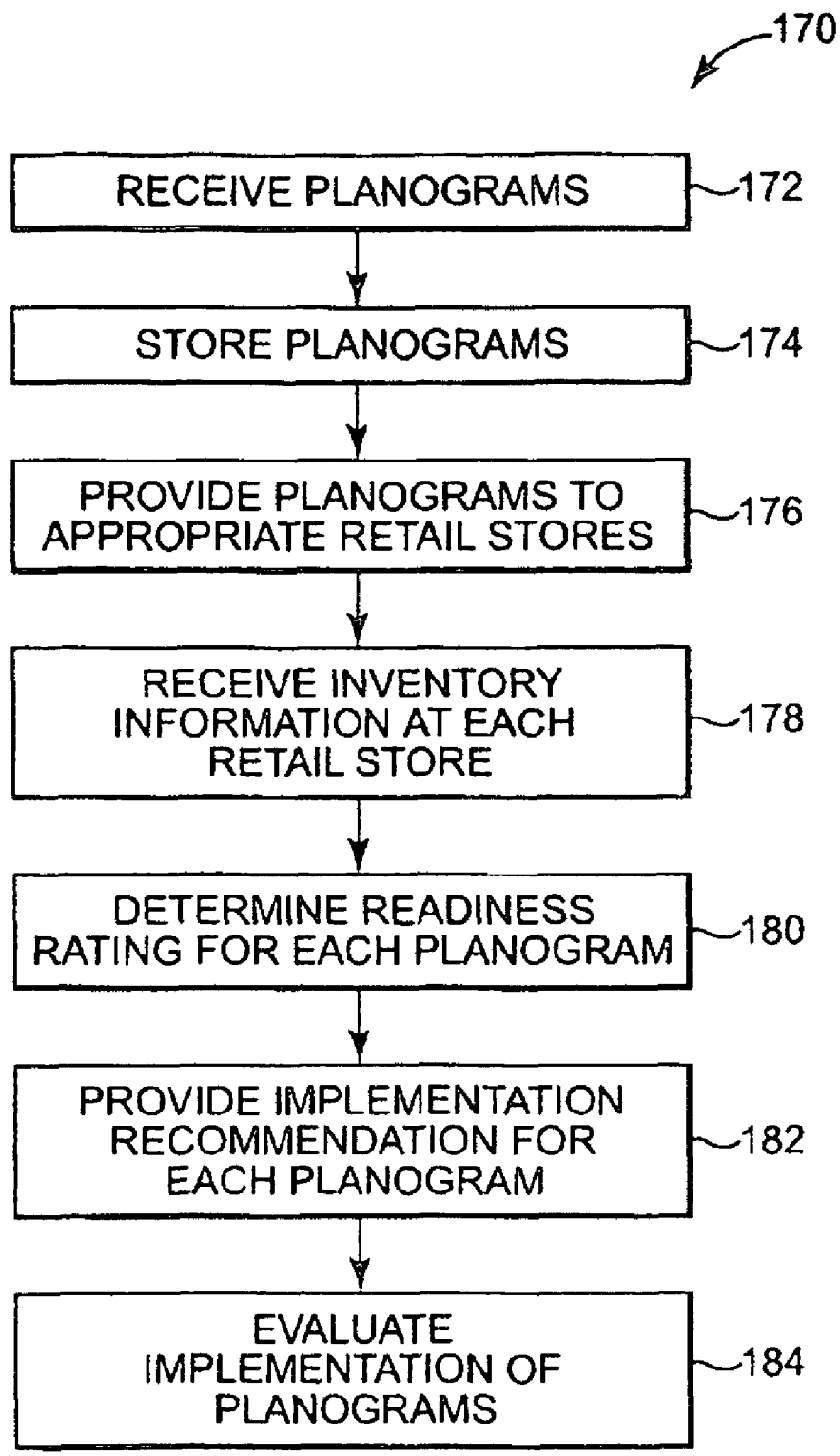
FIG. 5 is a flow diagram illustrating one embodiment of a process for implementing planograms according to the present invention.

FIG. 5 is a flow diagram illustrating one embodiment of a process 170 in accordance with an embodiment of the present invention for implementing planograms. Process 170 begins at 172 with the receipt of a plurality of planograms, wherein each planogram of the plurality of planograms is associated with one retail store of a plurality of retail stores. Each planogram is associated with a plurality of products to be displayed for sale at the associated retail store and includes data indicating threshold quantities of each product of the associated plurality of products. The threshold quantity represents the minimum quantity of units of the product required to "face" the planogram, as described above with respect to FIG. 1. At 174, the plurality of planograms is stored at a memory location, such as at memory 24 and memory 48 as illustrated by FIG. 1.

At 176, each planogram of the plurality of planograms is transmitted to its associated retail store. At 178, inventory information is received at each retail store, the retail information indicating in-stock quantities of each product of the plurality of products associated with each planogram associated with the retail store.

Process 170 then proceeds to 180 where, at each retail store, a readiness rating value is determined for each associated planogram, the readiness rating value being indicative of whether the planogram is ready to be implemented. In one embodiment, the readiness rating of each planogram comprises the percentage of the sum total of the threshold quantities of each product associated with the planogram that are in-stock, as described above with respect to FIG. 1.

Process 170 then proceeds to 182 where, at each retail store, an implementation recommendation is provided for each associated planogram, wherein the implementation recommendation is based on the readiness rating for each planogram, as described above with respect to FIG. 1. At 184, retail store employees evaluate implementation of each planogram based on the corresponding readiness. For example, retail store employees may delay implementation of a planogram or choose to implement one planogram before another, as described above with respect to FIG. 1.

Figure 6:
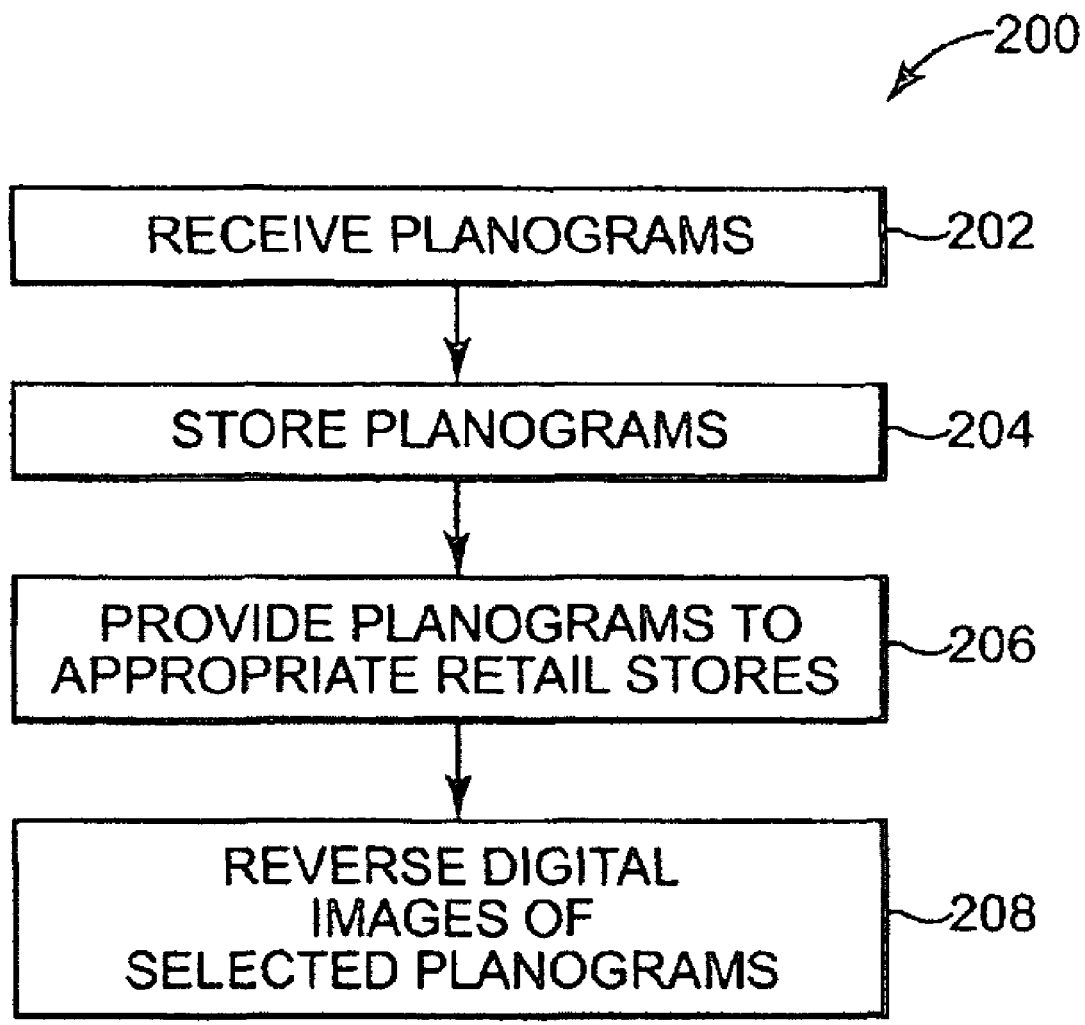
FIG. 6 is a flow diagram illustrating one embodiment of a process for implementing planograms according to the present invention.

FIG. 6 is a flow diagram illustrating one embodiment of a process 200 in accordance with the present invention for implementing planograms. Process 200 begins at 202 with receipt of a plurality of planograms, wherein each planogram of the plurality of planograms is associated with one retail store of a plurality of retail stores. Each planogram is associated with a plurality of products to be displayed for sale on one or more display fixtures within the associated store and includes a first digital image illustrating a respective position of each product on the one or more displays according to a first planogram orientation.

At 204, the plurality of planograms is stored at a memory location, such as at memory 24 and memory 48 as illustrated by FIG. 1. At 206, each planogram of the plurality of planograms is transmitted to its associated retail store.

Process 200 then proceeds to 208 where, at each retail store, a second digital image is provided for selected planograms by automatically reversing the corresponding first digital image so that the second digital image illustrates respective positions of each product on the one or more display fixtures according to a second planogram orientation which is the reverse of the first planogram orientation. In one embodiment, the first planogram orientation is a "forward" orientation, and the second planogram orientation is a "reverse" orientation, as described with respect to FIGS. 1, 2A, and 2B.

Components of the present invention can be implemented in hardware via a microprocessor, programmable logic, or state machine, in firmware, or in software with a given device. In one aspect, at least a portion of the software programming is web-based and written in HTML and JAVA programming languages, including links to user interfaces, such as a Windows based operating system, and each of the main components may communicate via a network using a communication protocol. For example, the present invention may or may not use a TCP/IP protocol for data transport. Other programming languages and communication protocols suitable for use with the present invention will become apparent to those skilled in the art after reading the present application. Components of the present invention may also reside in software on one or more computer-readable mediums, which is defined herein to include any kind of memory, volatile or non-volatile, such as floppy disks, hard drives, read-only memory (ROM), CD-ROMs, flash memory, and random access memory (RAM).

Although the invention has been described with respect to particular embodiments, such embodiments are for illustrative purposes only and should not be considered to limit the invention. Various alternatives and changes will be apparent to those of ordinary skill in the art.

What is claimed is:

1. An on-line planogram system comprising:
a central computing system storing a central planogram module configured to define and store a plurality of planograms, each planogram being associated with one or more retail stores of a plurality of retail stores, each planogram being associated with a plurality of products to be displayed on one or more display fixtures within the associated one or more retail stores, and each planogram including a first digital image illustrating a respective position of each product on the one or more display fixtures according to a planogram orientation; and
a plurality of retail computing systems, each storing a retail planogram module, each at a corresponding one of the plurality of retail stores, wherein each retail planogram module is configured to obtain the planograms associated with the corresponding retail stores, and each retail planogram module also being configured to generate a second digital image for each planogram, each second digital image being based on the first digital image of the planogram and illustrating a respective position of each product on the one or more display fixtures according to a display fixture orientation which is the reverse of the planogram orientation,
wherein each retail planogram module is further configured to receive a designation from a user at the corresponding retail store of a standard orientation or a reverse orientation of a retail display within the corresponding retail store; and display the first image of a selected planogram associated with the corresponding retail store upon receiving a designation of a standard orientation and display the second image of the selected planogram upon receiving a designation of a reverse orientation.

2. The on-line planogram system of claim 1, wherein the retail stores are associated with a retail corporation, and wherein the central planogram module is at a headquarters facility of the retail corporation.

3. The on-line planogram system of claim 1, wherein the central planogram module is coupled to each retail planogram module via a communications link.

4. The on-line planogram system of claim 1, further comprising at least one interface at each retail store, each interface adapted to enable a user to selectively view planograms, including the first and second digital images, associated with the corresponding retail store.

5. The on-line planogram system of claim 1, wherein the central planogram module and retail planogram modules comprise electronically readable code.

6. The on-line planogram system of claim 1, wherein the central planogram module stores the planograms at a memory location remote from the retail stores.

7. The on-line planogram system of claim 1, wherein each retail planogram module is adapted to store obtained planograms at a memory location local to the corresponding retail store.

8. The on-line planogram system of claim 1, further comprising:
a user device in wireless communication with one of the retail planogram modules, wherein the user device is mobile relative to the one of the retail planogram modules and is configured to receive the second digital image from the one of the retail planogram modules and to output the second digital image to the retail store employee at a sales floor location away from the associated one of the plurality of retail planogram modules.

9. The on-line planogram system of claim 1, wherein the planogram orientation indicates that a first product is located on a left end of the one or more display fixtures when the retail store employee walks past the one or more display fixtures in the corresponding one of the retail stores, and the display fixture orientation indicates that the first product is located on a right end of the one or more display fixtures when the retail store employee walks past the one or more display fixtures in the corresponding one of the retail stores.

10. The on-line planogram system of claim 1, wherein the central planogram module is configured to transmit pricing and label information associated with each corresponding planogram to the retail planogram module of the one retail store, each retail planogram module is configured to provide labels including the pricing and based on the label information for each product in the corresponding planogram, and each label is configured to be affixed to the one or more display fixtures in the one retail store where the corresponding planogram is implemented, and the labels are provided prior to implementing the corresponding planogram.

11. The on-line planogram system of claim 10, wherein each retail planogram module is adapted to provide a notification of changes to the pricing for previously provided labels and to provide updated labels prior to implementation of the corresponding planogram, and the updated labels include new price information based on the changes to the pricing.

12. The on-line planogram system of claim 11, wherein the updated labels are provided by a printer in communication with the retail planogram module and located at the one retail store.

13. A method of implementing planograms, the method comprising:
defining and storing a plurality of planograms at a central computing system, each planogram being associated with one or more retail stores of a plurality of retail stores, each planogram being associated with a plurality of products to be displayed on one or more display fixtures within the one or more associated retail stores, and each planogram including a first digital image illustrating a respective position of each product on the one or more display fixtures according to a first planogram orientation;

transmitting to a retail computing system of each retail store the planogram(s) associated with the retail store from the central computing system, wherein the retail computing system is remotely located from the central computing system and in communication with the central computing system via a communications network;

generating at each retail store via the retail computing system of the store a second digital image for each of selected one or more planograms associated with the retail store by automatically reversing the first digital image of each of the selected planograms such that each second digital image illustrates respective positions of each product on the one or more display fixtures according to a second planogram orientation which is the reverse of the first planogram orientation;

receiving a designation from a user at a particular retail store of a standard orientation or a reverse orientation of the retail display within the particular retail store; and displaying the first image of a selected planogram associated with the particular retail store upon receiving a designation of a standard orientation and displaying the second image of the selected planogram upon receiving a designation of a reverse orientation.

14. The method of claim 13, further comprising:
providing, at each retail store, product labels for placement on the one or more display fixtures in accordance with the planogram(s) associated with the retail store, the product labels including a price of each product referred to by the planogram(s) associated with the retail store.

15. The method of claim 14, further comprising:
providing, at each retail store, a notification of changes in the price of one or more products as included on the product labels, the notification being provided prior to implementation of the planogram(s) associated with the retail store.

16. The method of claim 13, further comprising:
providing, at each retail store, product labels for including with the planogram(s) associated with the retail store; and
printing at each retail store at least one updated label to replace at least one of the product labels following a change in a product price that occurs after providing the product labels and prior to implementing the planogram(s) associated with the retail store.

17. A retail space planning system comprising:
means for centrally defining and storing a plurality of planograms, each planogram being associated with one or more retail stores of a plurality of retail stores, each planogram being associated with a plurality of products to be displayed on one or more display fixtures within the one or more associated retail stores, and each planogram including a first digital image illustrating a respective position of each product on the one or more display fixtures according to a first planogram orientation;

means for transmitting at least one of the planograms associated with a particular retail store of the one or more retail stores to the particular retail store, wherein each of the one or more retail stores is remotely located with respect to the means for centrally defining and storing; and means for automatically generating at each retail store a second digital image for each of selected one or more planograms associated with the retail store by automatically reversing the first digital image of each of the selected planograms such that each second digital image illustrates respective positions of each product on the one or more display fixtures according to a second planogram orientation which is the reverse of the first planogram orientation; receiving a designation from a user at a particular retail store of a standard orientation or a reverse orientation of the retail display within the particular retail store; and displaying the first image of a selected planogram associated with the particular retail store upon receiving a designation of a standard orientation and displaying the second image of the selected planogram upon receiving a designation of a reverse orientation.

18. The retail space planning system of claim 17, further comprising:
means for providing original labels for the retail display within the particular retail store corresponding with the at least one of the planograms, the labels including prices for the products depicted by the at least one of the planograms; and
means for prompting the user to print updated labels when a price of the products has changed since the original labels were generated, wherein the means for prompting the user to print updated labels is configured to prompt the user to print updated labels before the at least one of the planograms is implemented in the retail store.

19. The retail space planning system of claim 18, further comprising:
means for printing the updated labels at the direction of the user following any prompting to print updated labels being communicated to the employee by the means for prompting.

20. The retail space planning system of claim 17, further comprising:
means for indicating to the particular retail store that one or more of the planograms has been revised since the one or more of the planograms was first provided to the retail store.

* * * * *